H. SANBORN.
MILKING PAIL.
APPLICATION FILED JUNE 19, 1912.

1,057,459. Patented Apr. 1, 1913.

Witnesses:

Inventor:
Horace Sanborn
by S. W. Bates
Atty.

UNITED STATES PATENT OFFICE.

HORACE SANBORN, OF NORWAY, MAINE.

MILKING-PAIL.

1,057,459.

Specification of Letters Patent.

Patented Apr. 1, 1913.

Application filed June 19, 1912. Serial No. 704,537.

*To all whom it may concern:*

Be it known that I, HORACE SANBORN, of Norway, in the county of Oxford and State of Maine, have invented certain new and useful Improvements in Milking-Pails, of which the following is a specification.

My invention relates to an attachment for milking pails which may be applied to any of the open pails now in common use and it is designed to partially cover the same to prevent the entrance of dirt.

The particular object of the invention is to provide a partially covered pail in which the opening for milking into the pail may be varied and in which it will not be necessary to use cloth or other fabric.

A further object is to provide a cover which will permit the milk to be readily poured from the back side.

The invention consists essentially of a cover preferably of metal which is designed to partially cover the pail and a suitable clamp for holding the cover on the top of the pail so as to leave a milking opening.
Preferably the cover is flat and the clamp permits it to slide into various positions to form openings of varying size according to the taste of the person milking the cow.

My invention may best be understood by referring to the accompanying drawing, in which is shown a common open topped pail with my cover applied.

Figure 1:
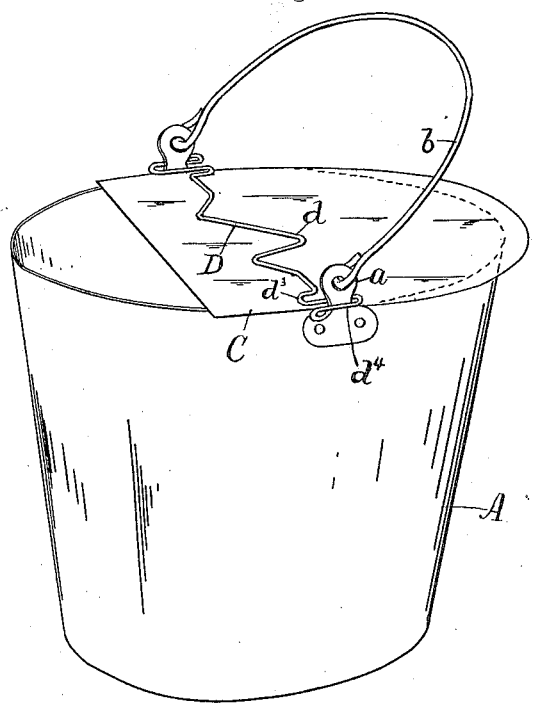
Figure 2:
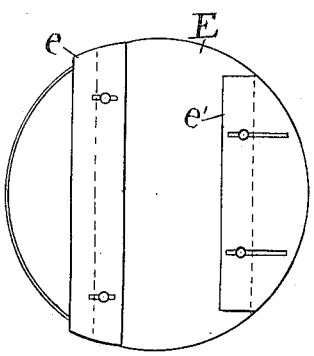

In the drawing, Figure 1 is a perspective view of the pail and cover, and Fig. 2 is a plan of a modification.

Referring to the drawing, A represents a common open topped pail with the usual ears $a$, and the bail or handle $b$. A cover is provided which will partially cover the pail leaving an opening on one side through which the milk is discharged into the pail from the udder. As here shown, I make use of a flat cover $c$ which is roughly in the form of a segment of a circle of slightly larger diameter than the top of the pail and embracing something more than half of the open top of the pail. It has a straight edge on one side and when in position this edge forms one side of the milking opening. The rear or rounded end extends back and normally overhangs the rear edge of the pail. The cover is so arranged that the size of the milking opening may be readily varied. As here shown, the cover is held in sliding relation with the top of the pail by means of a suitable clamp which permits it to slide forward and rearward to form milking openings of varying size. As here shown, the clamp consists of a piece of spring wire as
D corrugated in the body portion at $d$ to provide for extensibility and with a loop formed at each end which embraces the ear and presses down on the cover. As shown, the body portion extends forward to a point about even with the ear and thence doubles back to $d^3$, passes outward by the ear and then parallel with the ear forming a complete loop at $d^4$. The embracing loop thus clasps the ear firmly, pressing down on the cover and fits down so closely to the rim of the pail that the flat cover is pushed under it with more or less difficulty and is held firmly in any desired position. The cover is made large enough to allow for the small variations in pails of the same capacity, the clamp may be stretched or contracted lengthwise to fit any ordinary pail and the loop is sufficiently resilient to fit any size of ear.

In operation, the flat cover is laid on the top of the pail, the clamp D is applied to hold it down and the cover is then adjusted to form the desired size of opening. It often happens that men not accustomed to milking into small spaces will start with a large opening and gradually contract it as they become accustomed to the work. The dirt falling from the cow will collect largely on the top of the cover and around the edge of the pail which forms the milking opening. In pouring out the milk, the cover is pushed forward leaving an opening in the rear so that the milk does not have to be poured over the surface at the front where the dirt has accumulated. This is an important point in getting clean milk.

It is evident that the cover may be adjusted to vary the size of the opening and to form a discharge opening otherwise than by sliding it bodily as for instance in the modification shown in Fig. 2, in which E represents the body of the cover and $e$ an adjustable front portion arranged to slide forward and backward to vary the size of the milking opening without sliding the body of the cover. A similar sliding portion $e'$ on the back side may be provided for a discharge opening.

It is evident that the cover may be held on the top of the pail by a clamp other than that herein shown and that the device may be varied in other respects without departing from my invention as defined in the claims.

I claim:—

1. The combination of a milking pail, a cover therefor resting directly on the upper edge of the pail and a clamp for clamping said cover on the top of the pail in a position to partially close the same.

2. The combination of a milking pail, a cover therefor resting directly on the upper edge of the pail and a clamp for holding said cover on the top of the pail and in sliding relation thereto.

3. The combination of a milking pail, a cover therefor resting directly on the upper edge of the pail and a clamp for clamping the cover on the top of the pail in a plurality of positions to leave openings of different size.

4. The combination of a milking pail, a flat cover therefor resting directly on the upper edge of the pail and a clamp for holding said cover in frictional and sliding relation on the top of the pail.

5. The combination of a milking pail, a flat cover therefor resting directly on the upper edge of the pail adapted to partially close the top of the pail and a clamp for engaging the ears of the pail and holding the cover in sliding engagement with said top.

6. The combination of a milking pail, a flat segmental cover fitting the top of the pail and having a straight edge on its forward portion and a clamp for holding said cover in sliding engagement with the top of the pail.

7. The combination of a milking pail, an incomplete cover therefor resting directly on the upper edge of the pail leaving a milking opening and means for adjusting the cover to vary the size of the opening.

8. The combination of a milking pail having a flat cover resting directly on the upper edge of the pail, and a spring clamp for holding said cover yieldingly on the top of the pail.

9. The combination of a milking pail having a flat cover resting directly on the upper edge of the pail, and a spring clamp adapted to hold the cover yieldingly against the top of the pail and permitting it to slide thereon.

10. The combination of a milking pail, a cover therefor and a spring clamp composed of a piece of longitudinally extensible wire having ear engaging loops formed at each end and bent so as to press downward on the cover when said loops engage the ears of the pail.

11. The combination of a milking pail, a flat segmental cover resting directly on the top of the pail, said cover having a front edge forming with the edge of the pail a milk receiving opening and a clamp for holding the cover in a plurality of positions on top of the pail.

In testimony whereof I have affixed my signature, in presence of two witnesses.

HORACE SANBORN.

Witnesses:
 FRED E. SMITH,
 STELLA M. PIKE.

Copies of this patent may be obtained for five cents each, by addressing the "Commissioner of Patents, Washington, D. C."